US008806274B1

(12) United States Patent
Chatterjee et al.

(10) Patent No.: US 8,806,274 B1
(45) Date of Patent: *Aug. 12, 2014

(54) SNAPSHOT ASSISTED SYNCHRONOUS REPLICATION

(71) Applicant: American Megatrends, Inc., Norcross, GA (US)

(72) Inventors: Paresh Chatterjee, Fremont, CA (US); Narayanan Balakrishnan, Chennai (IN); Narayanaswami Ganapathy, Newark, CA (US); Jomy Jose Maliakal, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,047

(22) Filed: Oct. 8, 2012

Related U.S. Application Data

(63) Continuation of application No. 12/702,879, filed on Feb. 9, 2010, now Pat. No. 8,286,030.

(60) Provisional application No. 61/151,013, filed on Feb. 9, 2009.

(51) Int. Cl.
*G06F 11/07* (2006.01)
*G06F 11/20* (2006.01)
*G06F 11/14* (2006.01)

(52) U.S. Cl.
CPC ........ *G06F 11/2082* (2013.01); *G06F 11/1446* (2013.01)
USPC ................ 714/20; 714/15; 707/674; 707/684

(58) Field of Classification Search
CPC ............ G06F 2201/84; G06F 11/1446; G06F 11/2058; G06F 11/2082
USPC .............................. 714/15, 20; 707/674, 684
See application file for complete search history.

(56) References Cited

U.S. PATENT DOCUMENTS

| | | | |
|---|---|---|---|
| 7,162,662 B1 | 1/2007 | Svarcas et al. |
| 7,278,049 B2 | 10/2007 | Bartfai et al. |
| 7,337,195 B2 | 2/2008 | Hrle et al. |
| 7,363,537 B1 | 4/2008 | Svarcas et al. |
| 7,543,181 B2 | 6/2009 | Buxton et al. |
| 7,865,678 B2 | 1/2011 | Arakawa et al. |
| 8,010,509 B1 | 8/2011 | Khurana et al. |
| 8,060,714 B1 | 11/2011 | Natanzon |
| 2003/0195903 A1 | 10/2003 | Manley et al. |
| 2004/0010502 A1 | 1/2004 | Bomfim et al. |

(Continued)

*Primary Examiner* — Chae Ko
(74) *Attorney, Agent, or Firm* — Meunier Carlin & Curfman, LLC

(57) ABSTRACT

Technologies are described herein for providing snapshot-assisted synchronous replication between a first storage server and a second storage server. For example, a notification is received at the second storage server that the first storage server has resumed operations following a failure. At this time, the first storage server is in a first current state and the second storage server is in a second current state. Upon receiving the notification, a common snapshot is identified between the first storage server and the second storage server. Upon identifying the common snapshot, the first storage server is rolled back from the first current state to a previous state according to the common snapshot, and upon rolling back the first storage server from the first current state to the previous state, the first storage server and the second storage server are resynchronized using the common snapshot.

17 Claims, 9 Drawing Sheets

(56) References Cited

U.S. PATENT DOCUMENTS

| | | |
|---|---|---|
| 2004/0107381 A1 | 6/2004 | Bomfim et al. |
| 2005/0071708 A1* | 3/2005 | Bartfai et al. ............. 714/5 |
| 2006/0010300 A1 | 1/2006 | Arakawa et al. |
| 2006/0112151 A1 | 5/2006 | Manley et al. |
| 2007/0118705 A1 | 5/2007 | Arakawa et al. |
| 2007/0220311 A1* | 9/2007 | Lewin et al. ............. 714/6 |
| 2007/0226438 A1 | 9/2007 | Erofeev |
| 2007/0239944 A1 | 10/2007 | Rupanagunta et al. |
| 2007/0294274 A1* | 12/2007 | Kano ............. 707/101 |
| 2008/0168303 A1 | 7/2008 | Spear et al. |
| 2008/0229140 A1* | 9/2008 | Suzuki et al. ............. 714/2 |
| 2008/0250086 A1* | 10/2008 | Kisley ............. 707/204 |
| 2009/0125568 A1 | 5/2009 | Nishikawa et al. |
| 2009/0307166 A1* | 12/2009 | Routray et al. ............. 706/46 |
| 2009/0327568 A1* | 12/2009 | Wayda et al. ............. 710/306 |
| 2010/0030826 A1* | 2/2010 | Kohno et al. ............. 707/204 |
| 2010/0049753 A1 | 2/2010 | Prahlad et al. |
| 2011/0072104 A2* | 3/2011 | Wayda et al. ............. 709/217 |

\* cited by examiner

SNAPSHOT ASSISTED SYNCHRONOUS REPLICATION

CROSS-REFERENCE TO RELATED APPLICATIONS

This application is a continuation of U.S. patent application Ser. No. 12/702,879, filed on Feb. 9, 2010, and entitled "Information Lifecycle Management Assisted Asynchronous Replication," and claims the benefit of U.S. Provisional Patent Application No. 61/151,013, filed on Feb. 9, 2009, the disclosures of which are expressly incorporated herein by reference in their entireties.

BACKGROUND

Disaster recovery ("DR") is one of the most pressing issues faced by the storage industry today. DR generally refers to solutions for recovering critical data and/or resuming operation of storage systems and other technology infrastructure. Various factors may be considered when architecting a DR solution. Examples of these factors may include Service Level Agreements ("SLA"), meeting a tolerable Recovery Point Objective ("RPO"), and/or meeting a tolerable Recovery Time Objective ("RTO"). Other factors may include affordability, ease, robustness, reliability, and manageability with respect to each particular solution.

A conventional solution for recovering lost data in the event of a disaster is storage replication, in which data is written to multiple storage devices across a computer network. Storage replication may include synchronous replication and asynchronous replication. In synchronous replication, each I/O operation by an application server to a primary storage device is replicated on a secondary storage device before the primary storage device acknowledges the application server. This acknowledgement is made after the I/O operations on both the primary storage device and the secondary storage device are completed. In this way, the primary storage device and the secondary storage device are always "synchronized." In asynchronous replication, the primary storage device acknowledges the application server upon completing each I/O operation without waiting for the secondary storage device to replicate the I/O operation. The application server can then continue performing additional I/O operations on the primary storage device. The I/O operations completed on the primary storage device may be replicated on the secondary storage device according to a specified replication rate.

While synchronous replication implementations ensure the consistency of data between the primary and the secondary storage devices during normal running times, the synchronization can be severed when either one or both of the storage devices fail or the network connecting the storage devices fails. In such instances, even if both of the storage devices are synchronized, the two storage devices can become out of sync due to the momentary I/O traffic happening from the application server. Now, if any of the storage devices were to continue receiving I/O operations from the application server, then the difference between the two storage devices will keep increasing. This difference, known as a "tab," may be maintained in the memory of the active storage device so that the other storage device can be synchronized when it becomes available again. This difference may also be persisted on a non-volatile medium, such as disk, to ensure that this tab information is not lost across power failures. This difference stored on disk, known as the "gate," is persisted based on a write-intent logging mechanism that records the intention to perform a write I/O operation to the disk prior to performing it.

The difference information, i.e., the tab and the gate, often includes much more than the differences created after the communication failure between the two storage devices. For example, the difference information may also include a record of all the I/O operations that happened prior to the failure and might have been held on volatile cache memory of either storage device. Since this information, which was previously synchronized but not persisted to the non-volatile media, could be lost due to a power failure in the storage devices, this information may also be tabbed and gated. Thus, the operation of tabbing and gating, while necessary, may often result in excess data traffic during the re-synchronization of the storage devices, thereby wasting bandwidth and processing cycles.

Some implementations of asynchronous replication utilize snapshots, which are point-in-time images of a given storage volume. Snapshots may be taken at a specified snapshot rate on a primary storage device and replicated on a secondary storage device across a network at a specified replication rate. In some cases, the primary storage device and the secondary storage device may have different retention rates, which specify the amount of time that snapshots are stored on the respective storage devices. For example, the secondary storage device may store fewer snapshots than the primary storage device.

During a DR scenario, the primary storage device may revert back to a previous snapshot prior to the failure. In order to synchronize the primary storage device and the secondary storage device, the secondary storage device may also need to revert back to the same snapshot. However, if the primary storage device and the secondary storage device have different retention rates, then the secondary storage device may have already deleted that snapshot. In conventional implementations, the secondary storage device reverts back to the earliest stored snapshot that corresponds to a matching snapshot in the primary storage device. Replication is then repeated from this snapshot forward. In the worst case, the secondary storage device reverts back to a base blank volume, where replication is entirely repeated from the beginning. As such, these conventional implementations can be wasteful in terms of bandwidth, time, cost metrics, and the like.

It is with respect to these and other considerations that the disclosure made herein is presented.

SUMMARY

Technologies are described herein for providing various implementations of assisted storage replication. In some implementations, information lifecycle management ("ILM") data is utilized to assist asynchronous replication and synchronous replication. In some other implementations, snapshots are utilized to assist in synchronous replication.

Some technologies provide snapshot-assisted synchronous replication between a first storage server and a second storage server. For example, a notification is received at the second storage server that the first storage server has resumed operations following a failure. At this time, the first storage server is in a first current state and the second storage server is in a second current state. Upon receiving the notification, a common snapshot is identified between the first storage server and the second storage server. Upon identifying the common snapshot, the first storage server is rolled back from the first current state to a previous state according to the common snapshot, and upon rolling back the first storage server from the first current state to the previous state, the first storage server and the second storage server are resynchronized using the common snapshot.

In some implementations, re-synchronizing the first storage server and the second storage server can include rolling back the second storage server from the second current state to the previous state according to the common snapshot.

Additionally, the common snapshot can be a first common snapshot of the first storage server and a second common snapshot of the second storage server. The first common snapshot and the second common snapshot can define the previous state.

In some implementations, the first storage server is rolled back from the first current state to the previous state according to the first common snapshot, and the second storage server is rolled back from the second current state to the previous state according to the second common snapshot.

Optionally, the first common snapshot of the first storage server and the second common snapshot of the second storage server can be taken based on a snapshot schedule.

In addition, upon re-synchronizing the first storage server and the second storage server using the common snapshot, synchronous replication of I/O operations between the first storage server and the second storage server can optionally be resumed. For example, resuming synchronous replication of I/O operations between the first storage server and the second storage server can include: receiving an I/O operation at the first storage server; and replicating the I/O operation to the second storage server before acknowledging the I/O operation.

It should be understood that the above-described subject matter may also be implemented as a computer-controlled apparatus, a computer process, a computing system, or an article of manufacture, such as a computer-readable storage medium.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
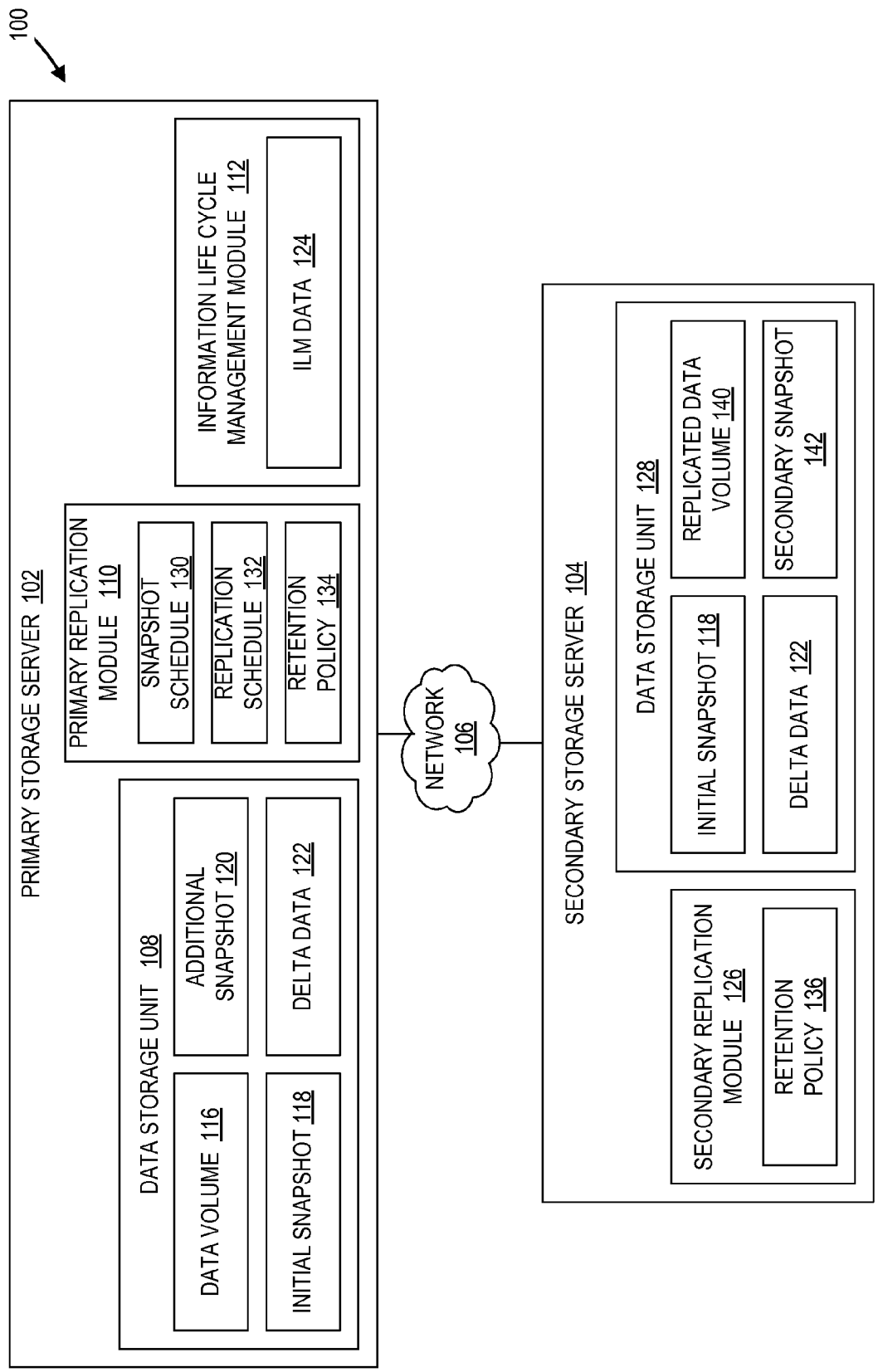
FIG. 1 is a network architecture diagram of a storage replication system configured to implement embodiments of a novel implementation of information lifecycle management ("ILM") assisted replication, in accordance with some embodiments.

The following detailed description is directed to technologies for utilizing information lifecycle management ("ILM") data and snapshots to provide more efficient storage replication, in accordance with some embodiments. In some embodiments, technologies for utilizing ILM data to assist snapshot-assisted replication are provided. In other embodiments, technologies for utilizing snapshots to assist synchronous replication are provided. In yet other embodiments, technologies for utilizing ILM data to assist synchronous replication are provided.

As used herein, a "snapshot" refers to an image of a given data volume at a particular point in time. In an example implementation, a storage replication solution may take a snapshot of a first data volume. Upon taking the snapshot, the storage replication solution may transfer the snapshot to a second data volume over a network. The storage replication solution may then write the snapshot into the second data volume, thereby replicating the snapshot. Upon writing the snapshot into the second data volume, the storage replication solution may take an additional snapshot of the second data volume so that primary and secondary snapshots are same. This snapshot replication solution can continue for additional data volumes as desired.

The storage replication solution may take multiple snapshots of the first data volume at a predefined schedule or under the direction of an administrator. The storage replication solution may then replicate the snapshots through synchronous or asynchronous replication. In the event of a disaster that corrupts the first data volume, the administrator can restore the first data volume based on at least one of the replicated snapshots. A greater number of replicated snapshots may provide a greater number of recovery points (also referred to as consistency points) from which the administrator can restore the first data volume.

In some implementations, the storage replication solution may implement snapshot-assisted replication. In snapshot-assisted replication, the storage replication solution may generate an initial snapshot of the first data volume and replicate the initial snapshot on the second data volume. When the storage replication solution generates each additional snapshot following the initial snapshot, the storage replication solution does not replicate the entire additional snapshot on the second data volume. Instead, the storage replication solution replicates only delta data (i.e., block-level differences) between each additional snapshot and the immediately preceding snapshot. Thus, the delta data may include new data and modified data, but might not include old data that remains the same. By implementing snapshot-assisted replication, the storage replication solution can significantly reduce the amount of data that needs to be replicated.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, FIG. 1 shows an illustrative network architecture diagram of a storage replication system 100 configured to implement embodiments of a novel implementation of information life cycle management ("ILM") assisted asynchronous replication described herein. According to some embodiments, the storage replication system 100 is adapted to perform asynchronous replication. In particular, the storage replication system 100 may include a primary storage server 102 and a secondary storage server 104 coupled via a network 106. Although only two storage servers 102, 104 are illustrated in FIG. 1, it should be appreciated that the storage replication system 100 may implement additional storage servers.

As illustrated in FIG. 1, the primary storage server 102 may include a data storage unit 108, a primary replication module 110, and an ILM module 112. The data storage unit 108 may store a data volume 116, multiple snapshots including an initial snapshot 118 and an additional snapshot 120, and delta data 122. The primary replication module 110 may include a snapshot schedule 130, a replication schedule 132, and a retention policy 134. The ILM module 112 may provide ILM data 124. Also as illustrated in FIG. 1, the secondary storage server 104 includes a secondary replication module 126 and a data storage unit 128. The data storage unit 128 may store data, including the initial snapshot 118 and the delta data 122, corresponding to the snapshot replication process performed by the primary replication module 110 and the secondary replication module 126. The data storage unit 128 may further store a replicated data volume 140 and multiple snapshots, including a secondary snapshot 142, of the replicated data volume 140. The secondary replication module 126 may include a retention policy 136. As used herein, a snapshot is "replicated" if the entire snapshot or the corresponding delta data has been written to the data storage unit 128. Further, as used herein, a "replicated snapshot" may refer to either a snapshot or delta data that has been written to the data storage unit 128.

According to some embodiments, the primary replication module 110 may take the initial snapshot 118 of the data volume 116. Upon taking the initial snapshot 118, the primary replication module 110 may transfer the initial snapshot 118 to the secondary storage server 104 over the network 106. The secondary replication module 126 may receive the initial snapshot 118 and write the initial snapshot 118 to the data storage unit 128. The secondary replication module 126 may also replicate the data volume 116 on the replicated data volume 140 based on the initial snapshot 118.

After the taking the initial snapshot 118, the primary replication module 110 may take additional snapshots, such as the additional snapshot 120. Upon taking the additional snapshot 120, the primary replication module 110 may generate the delta data 122 identifying the block-level differences between the immediately preceding snapshot (in this case, the initial snapshot 118) and the additional snapshot 120. For example, the delta data 122 may include new data and modified data, but might not include old data that remains the same. The primary replication module 110 may then transfer the delta data 122, instead of the entire additional snapshot 120, to the secondary storage server 104 over the network 106. The secondary replication module 126 may receive the delta data 122 and write the delta data 122 to the data storage unit 128. The secondary replication module 126 may also update the replicated data volume 140 based on the delta data 122. Upon updating the replicated data volume 140, the secondary replication module 126 may take the secondary snapshot 142 of the replicated data volume 140.

According to some embodiments, the primary replication module 110 may take snapshots, such as the initial snapshot 118 and the additional snapshot 120, at a predefined schedule, such as the snapshot schedule 130, or upon the direction of an administrator. Further, the primary replication module 110 may replicate the snapshots at a predefined schedule, such as the replication schedule 132, or upon the direction of an administrator. The snapshot schedule 130 and the replication schedule 132 may be configured according to any suitable criteria.

During a DR scenario, the primary storage server 102 may roll back the data volume 116 according to a previous snapshot prior to the failure. In order to synchronize the primary storage server 102 and the secondary storage server 104, the secondary storage server 104 may also need to roll back the replicated data volume 140 according to the same snapshot. However, if the primary storage server 102 and the secondary storage server 104 have different retention rates as specified by the retention policies 134, 136, then the secondary storage server 104 may have already deleted that snapshot. For example, the secondary storage server 104 may have a different retention policy than the primary storage server 102 because the secondary storage server 104 stores replicated snapshots from multiple primary storage servers. In this case, the secondary storage server 104 may store only a limited number of replicated snapshots for each primary storage server due to storage capacity constraints.

In conventional implementations, the secondary storage server 104 rolls back the replicated data volume 140 according to the earliest stored snapshot that corresponds to a matching snapshot in the primary storage server 102. The snapshot replication process as previously described is then repeated from this snapshot forward in order to synchronize the secondary storage server 104 with the primary storage server 102. In the worst case, the secondary storage server 104 rolls back the replicated data volume 140 to a base blank volume, where the replication process is entirely repeated from the beginning.

Figure 2:
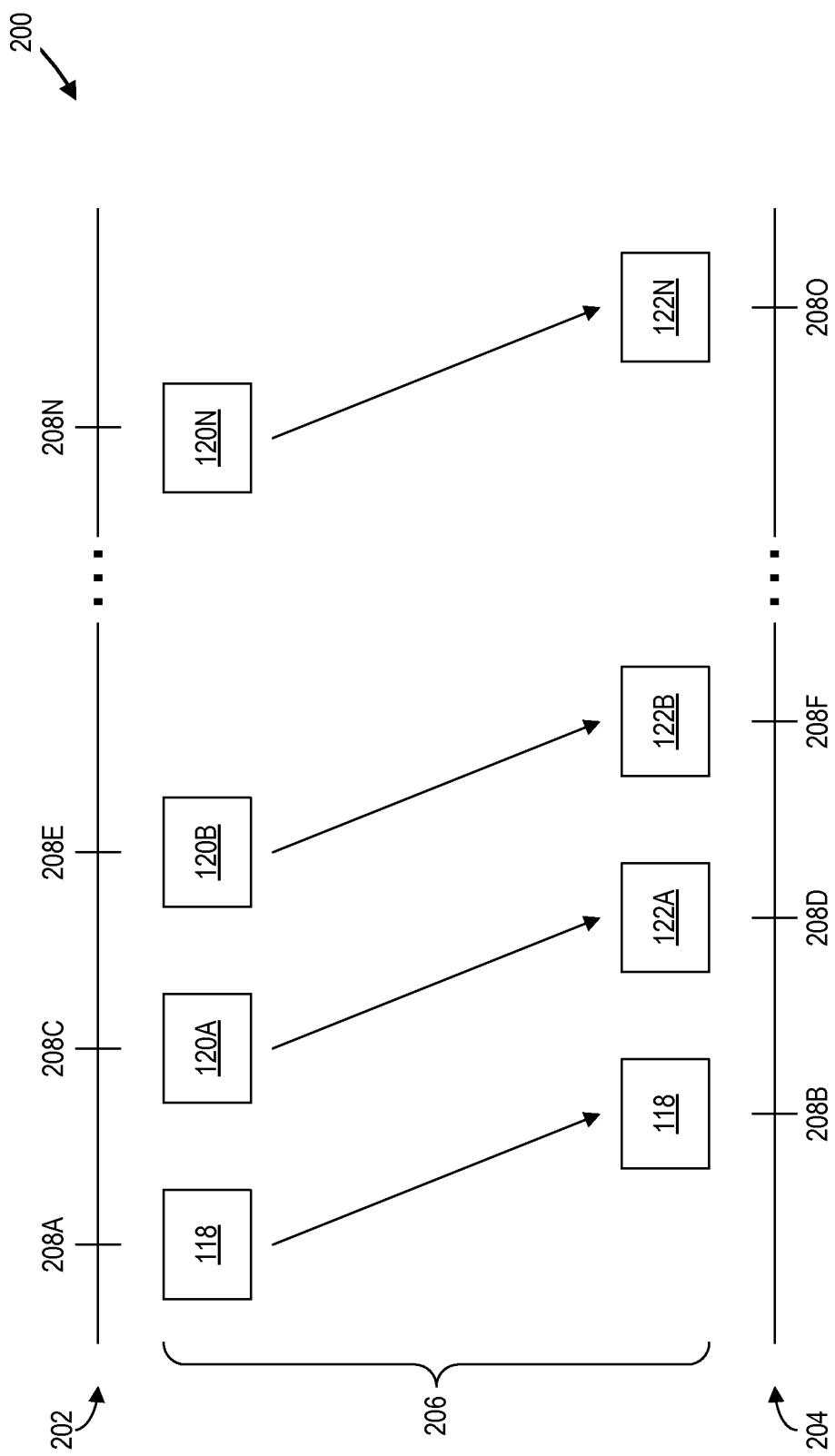
FIG. 2 is a diagram of a replication sequence between a primary storage server and a secondary storage server across a network, in accordance with some embodiments.

Referring now to FIG. 2, additional details regarding snapshot-assisted replication will be described according to some embodiments. As illustrated in FIG. 2, a diagram 200 shows a replication sequence between the primary storage server 102 and the secondary storage server 104 across the network 106. In particular, the diagram 200 includes a first timeline 202 and a second timeline 204. The first timeline 202 shows the time when snapshots are taken by the primary replication module 110. The primary replication module 110 may take the snapshots according to the snapshot schedule 130. In relation to the first timeline 202, the second timeline 204 shows the time when the primary replication module 110 and the secondary replication module 126 replicates the snapshots taken by the primary replication module 110. The primary replication module 110 and the secondary replication module 126 may replicate the snapshots according to the replication schedule 132. A transfer portion 206 shows data transfers across the network 106 between the primary replication module 110 and the secondary replication module 126.

In the example illustrated in FIG. 2, the primary replication module 110 takes the initial snapshot 118 at a first time 208A according to the snapshot schedule 130. Upon taking the initial snapshot 118, the primary replication module 110 transfers the initial snapshot 118 to the secondary storage server 104. The secondary replication module 126 then receives the initial snapshot 118 and completes writing the initial snapshot 118 to the data storage unit 128 at a second time 208B, which follows the first time 208A.

The primary replication module 110 takes a first additional snapshot 120A at a third time 208C according to the snapshot schedule 130. As previously described, the primary replication module 110 may transfer corresponding first delta data 122A, rather than the entire first additional snapshot 120A. The first delta data 122A may represent the block-level differences between the initial snapshot 118 and the first additional snapshot 120A. Upon taking the first additional snapshot 120A, the primary replication module 110 computes and transfers the first delta data 122A to the secondary storage server 104 according to the replication schedule 132. The secondary replication module 126 then receives the first delta data 122A and writes the first delta data 122A to the data storage unit 128 at a fourth time 208D, which follows the third time 208C.

The primary replication module 110 continues to take a second additional snapshot 120B, and additional snapshots including an Nth additional snapshot 120N at a fifth time 208E and a time 208N, respectively, according to the snapshot schedule 130. The primary replication module 110 computes and transfers corresponding second delta data 122B and Nth delta data 122N to the secondary storage server 104 according to the replication schedule 132. The secondary replication module 126 then receives the second delta data 122B and writes the second delta data 122B to the data storage unit 128 at a sixth time 208F. The secondary replication module 126 also receives the Nth delta data 122N and writes the Nth delta data 122N to the data storage unit 128 at a time 208O.

Figure 3:
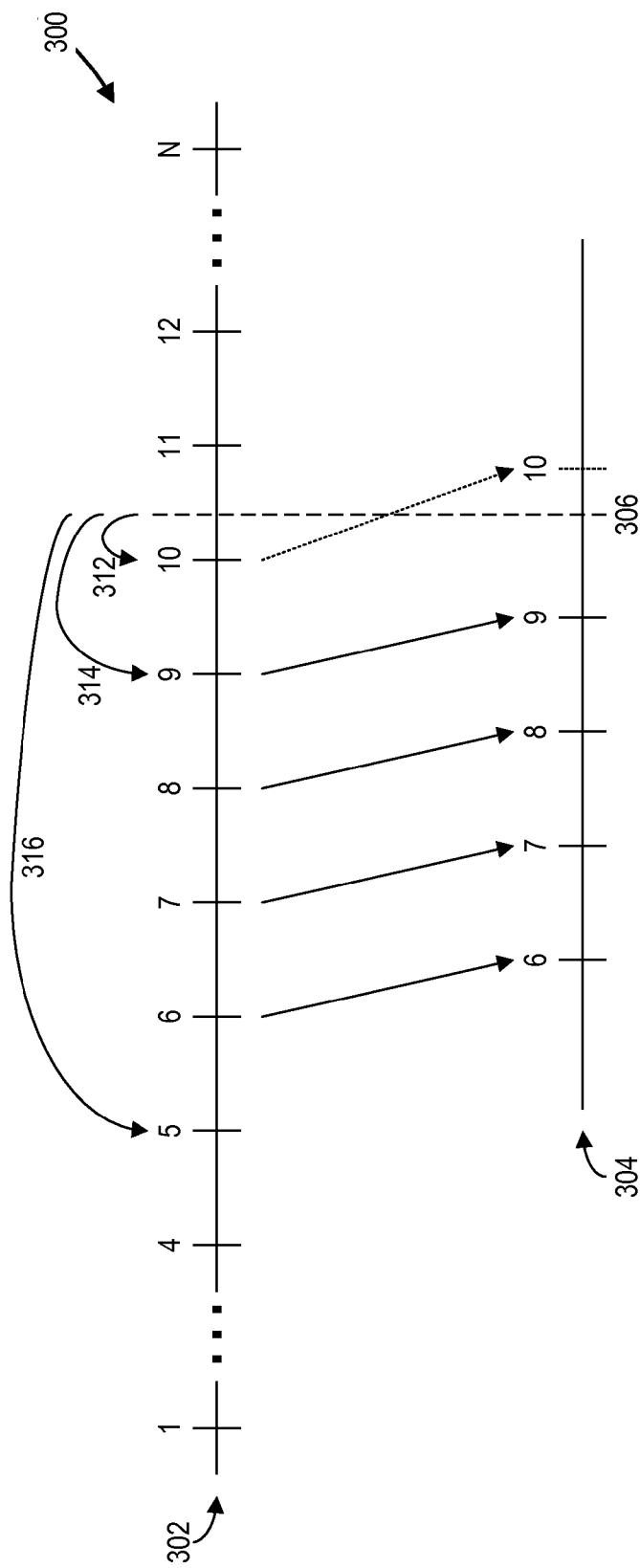
FIG. 3 is a diagram of an ILM assisted recovery sequence, in accordance with some embodiments.

Referring now to FIG. 3, additional details regarding the operation of the primary replication module 110 and the secondary replication module 126 will be described according to some embodiments. As illustrated in FIG. 3, a diagram 300 shows an ILM-assisted recovery sequence between the primary storage server 102 and the secondary storage server 104. In particular, the diagram 300 includes a first timeline 302 and a second timeline 304. The first timeline 302 shows snapshots taken by the primary replication module 110 and currently stored on the data storage unit 108 according to the retention policy 134. The second timeline 304 shows replicated snapshots currently stored on the data storage unit 128 according to the retention policy 136. A dashed line 306 represents the current replication point within the replication sequence.

In an illustrative example, the retention policy 134 indicates that the data storage unit 108 stores one hundred snapshots at a given time, and the retention policy 136 indicates that the data storage unit 128 stores four snapshots at a given time. In other examples, the retention policy 134 may indicate that the data storage unit 128 stores more snapshots than the data storage unit 108. As illustrated in FIG. 3, at the time indicated by dashed line 306, the data storage unit 108 on the primary storage server 102 stores the first through tenth snapshots. However, the data storage unit 128 on the secondary storage server 104 stores only the sixth through ninth snapshots. The primary replication module 110 and the secondary replication module 126 may enforce the retention policy 134 and the retention policy 136, respectively, according to a first-in-first-out ("FIFO") basis. For example, the dashed line 306 indicates that the tenth snapshot is being replicated but has not yet been completed. When the tenth snapshot completes replicating, the secondary replication module 126 may erase the sixth snapshot from the data storage unit 128 because the sixth snapshot is the earliest replicated snapshot.

According to some embodiments, the primary replication module 110 and the secondary replication module 126 operates differently according to three DR scenarios. In the first DR scenario, the primary replication module 110 rolls back the data volume 116 according to a snapshot that has yet to be replicated. In this case, the primary replication module 110 and the secondary replication module 126 simply wait until the snapshot is replicated. For example, if the primary storage server 102 rolls back the data volume 116 according to the tenth snapshot as indicated at 312, then the primary replication module 110 waits until the tenth snapshot has completed replicating. The primary replication module 110 then proceeds to continue taking snapshots and replicating snapshots from the tenth snapshot according to the snapshot schedule 130 and the replication schedule 132.

In the second DR scenario, the primary replication module 110 rolls back the data volume 116 according to a previous snapshot that has been replicated and is present on the secondary storage server 104. In this case, the primary replication module 110 rolls back the data volume 116 according to the previous snapshot. The secondary replication module 126 also rolls back the replicated data volume 140 according to the previous snapshot in order to ensure that the secondary storage server 104 is synchronized with the primary storage server 102. For example, if the primary storage server 102 rolls back the data volume 116 according to the ninth snapshot as indicated at 314, then the secondary replication module 126 also rolls back the replicated data volume 140 according to the ninth snapshot, thereby synchronizing the secondary storage server 104 with the primary storage server 102. The primary replication module 110 then proceeds to continue taking snapshots and replicating snapshots from the ninth snapshot according to the snapshot schedule 130 and the replication schedule 132.

In the third DR scenario, the primary replication module 110 rolls back the data volume 116 according to a previous snapshot that has been replicated and is not present on the secondary storage server 104. Since the previous snapshot is not present on the secondary storage server 104, the primary replication module 110 and the secondary replication module 126 cannot synchronize the data storage unit 108 and the data storage unit 128 based on the previous snapshot. In this case, the secondary replication module 126 may retrieve the ILM data 124 from the ILM module 112. According to some embodiments, the ILM data 124 specifies, among other things, the last time (e.g., through a timestamp) that a given block of data (or more than one block of data, depending on the defined granularity) was accessed. The ILM data 124 may track the last (i.e., the most recent) access time for every block of data in the data storage unit 108 and the data storage unit 128. Since the ILM data 124 tracks the blocks that were accessed in both of the data storage unit 108 and the data storage unit 128, the secondary replication module 126 need only roll back the replicated data volume 140 according to the most recent consistency point between the data storage unit 108 and the data storage unit 128 at or prior to the previous snapshot. The last consistency point may refer to the time of the last snapshot that was successfully replicated.

For example, if the primary storage server 102 rolls back the data volume 116 according to the fifth snapshot as indicated at 314, then the primary replication module 110 rolls back the data volume 116 according to the fifth snapshot. However, the secondary replication module 126 cannot roll back the replicated data volume 140 according to the fifth snapshot because the fifth snapshot has been removed from the data storage unit 128. Thus, the secondary replication module 126 retrieves the ILM data 124, which indicates that the last consistency point at or prior to the fifth snapshot was at the time of the fifth snapshot. That is, the fifth snapshot was previously successfully replicated between the primary storage server 102 and the secondary storage server 104. As such, the secondary replication module 126 rolls back the data storage unit 128 to the state of the data storage unit 128 at the time of the fifth snapshot based on the ILM data 124. In essence, through the ILM data 124, the secondary replication module 126 can roll back the data storage unit 128 according to the fifth snapshot even when the fifth snapshot is unavailable.

Figure 4:
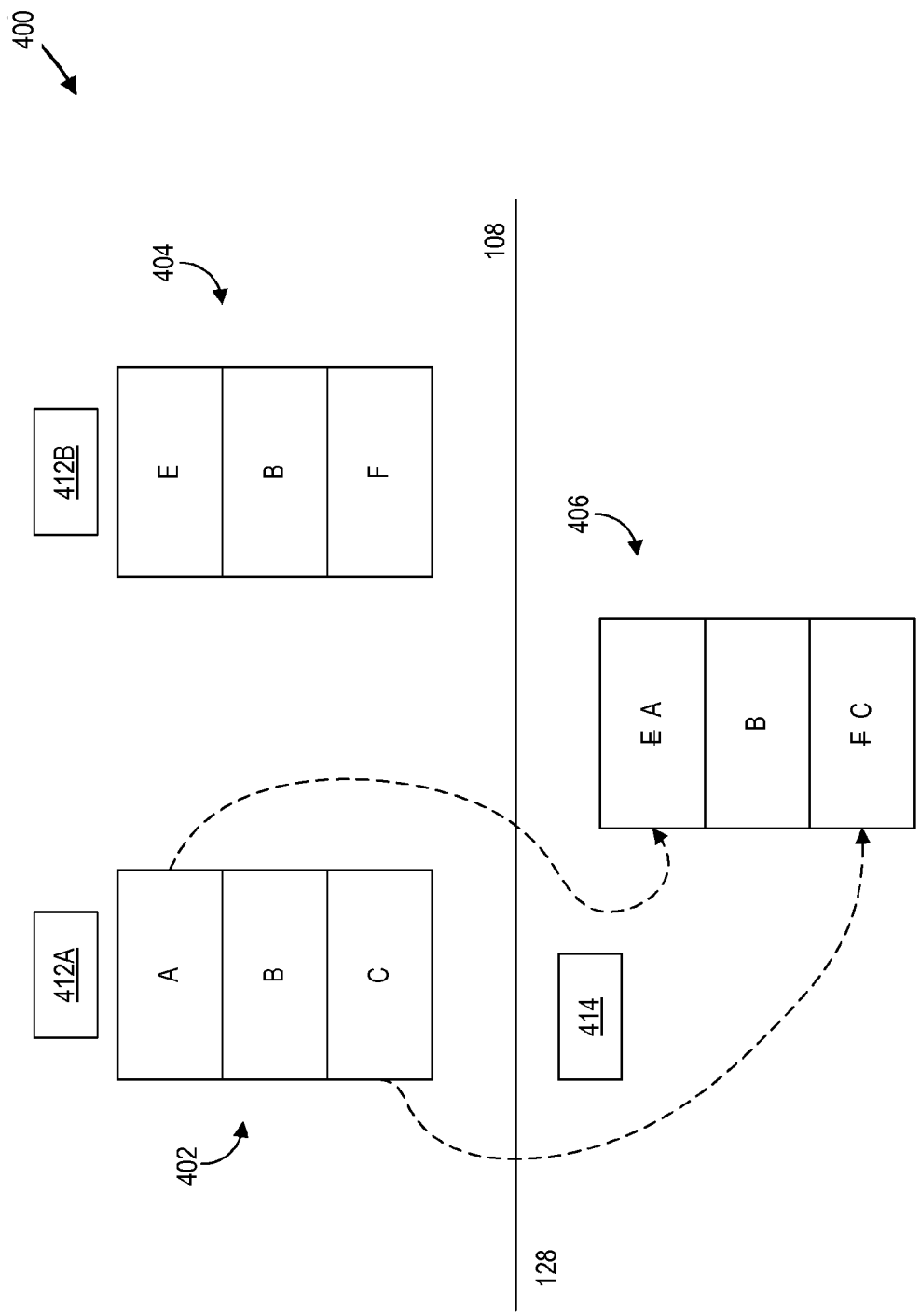
FIG. 4 is a diagram of a replication process utilizing the ILM data, in accordance with some embodiments.

Referring now to FIG. 4, additional details regarding the third DR scenario will be described where the primary replication module 110 rolls back the data volume 116 to a previous snapshot that has been replicated, but is no longer present on the secondary storage server 104, according to some embodiments. As illustrated in FIG. 4, a diagram 400 shows a replication process utilizing the ILM data 124. In particular, the diagram 400 includes a first state 402 of the data volume 116 and a second state 404 of the data volume 116. The first state 402 may correspond to a first snapshot 412A, and the second state 404 may correspond to a second snapshot 412B. The first snapshot 412A and the second snapshot 412B may be stored in the data storage unit 108.

The second state 404 may represent the most recent contents of the data volume 116 for which a snapshot has been taken and is being replicated. In an illustrative example, the first snapshot 412A is not stored in the data storage unit 128 of the secondary storage server 104 at the time of the rollback. For example, the retention policy 136 may have caused the corresponding replicated snapshot to be erased. The diagram 400 further shows a current state 406 of the replicated data volume 140. It will be appreciated that the current state 406 of the replicated data volume 140 matches the second state 404 of the data volume 116 because the current state 406 of the replicated data volume 140 corresponds to the most recently replicated snapshot, which is the second snapshot 412B.

In an example DR scenario, the primary replication module 110 rolls back the data volume 116 to the first snapshot 412A. Since the first snapshot 412A is not stored on the data storage unit 128 of the secondary storage server 104 at the time of the rollback, the secondary replication module 126 retrieves the ILM data 124 from the ILM module 112. The secondary replication module 126 then identifies the last consistent point common to the data volume 116 and the replicated data volume 140 at or prior to the first snapshot 412A based on the ILM data 124. In this example, the ILM data 124 specifies that this last consistent point is the point is in the time of the first snapshot 412A. As such, the secondary replication module 126 rolls back the data volume 116 to the first state 402 corresponding to the first snapshot 412A. According to some embodiments, the ILM data 124 specifies, through the access timestamps, data that has been changed between the first state 402 and the second state 404. For example, the ILM data 124 may specify that a first block "A" in the first state 402 has been changed to "E" in the second state 404. The ILM data 124 may further specify that a third block "C" in the first state 402 has been changed to "F" in the second state 404.

In this example, the primary replication module 110 may replicate only the first block "A" and the second block "C" as contained in replicated data 414. The secondary replication module 126 may receive the replicated data 414 and update the contents of the replicated data volume 140. In particular, the secondary replication module 126 may change the first block from "E" back to "A" and change the third block from "F" back to "C". The second block "B" remains the same, and thus, is not contained in the replicated data 414. In this way, primary storage server 102 is synchronized with the secondary storage server 104. The primary replication module 110 then proceeds to continue taking snapshots and replicating snapshots from the first snapshot 412A according to the snapshot schedule 130 and the replication schedule 132.

Figure 5:
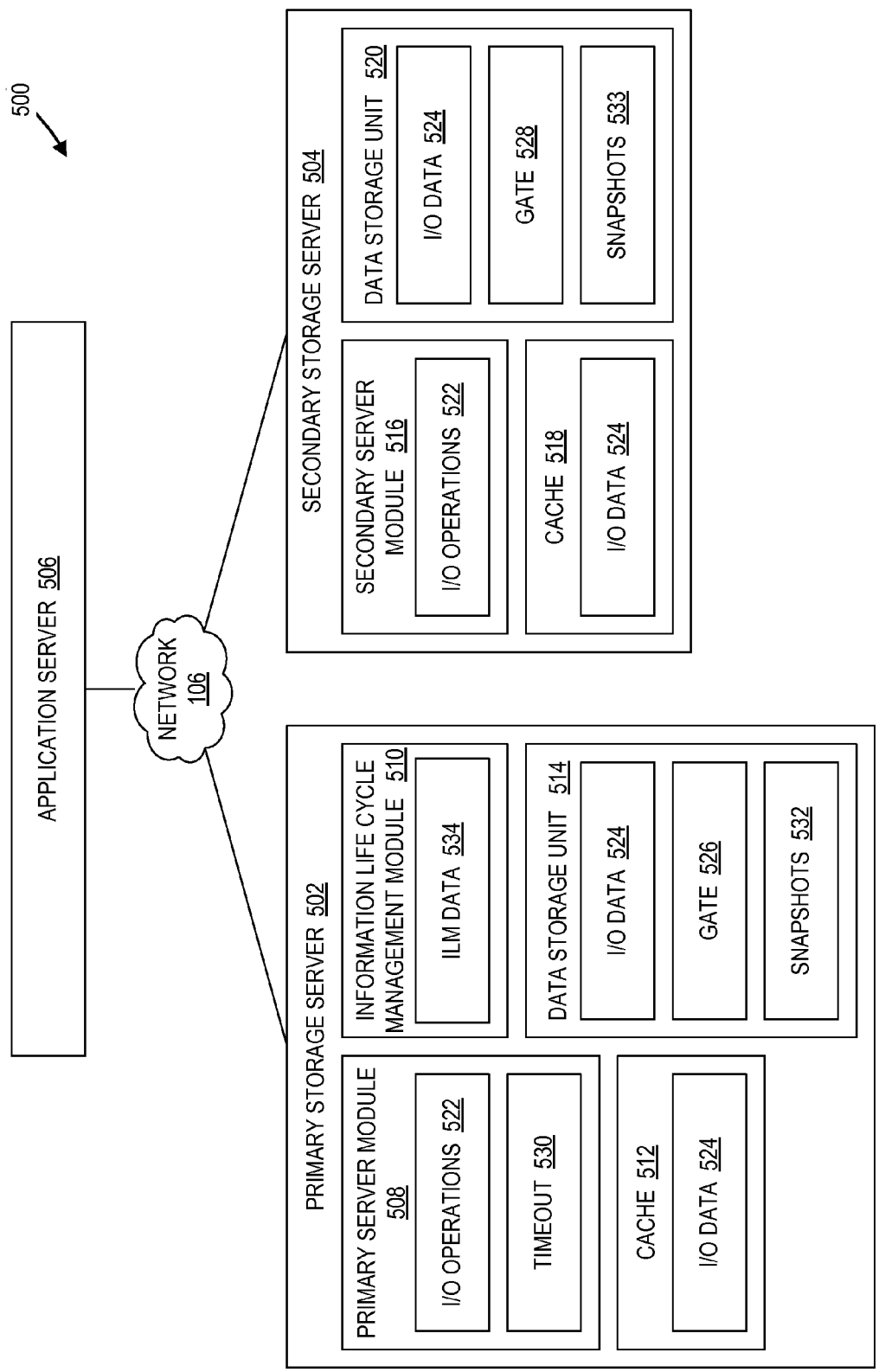
FIG. 5 is a network architecture diagram of a storage replication system configured to implement embodiments of another novel implementation of ILM assisted replication, in accordance with some embodiments.

Referring now to FIG. 5, an illustrative network architecture diagram of a storage replication system 500 configured to implement embodiments of novel implementations of ILM assisted synchronous replication and snapshot assisted synchronous replication are shown. According to some embodiments, the storage replication system 500 is adapted to perform synchronous replication. In particular, the storage replication system 500 may include a primary storage server 502, a secondary storage server 504, and an application server 506 coupled via a network 106. Although only two storage servers 502, 504 are illustrated in FIG. 5, it should be appreciated that the storage replication system 500 may implement additional storage servers.

As illustrated in FIG. 5, the primary storage server 502 includes a primary server module 508, an ILM module 510, a cache 512, and a data storage unit 514. The secondary storage server 504 includes a secondary server module 516, a cache 518, and a data storage unit 520. According to some embodiments, the application server 506 transmits one or more input/output ("I/O") operations 522 to the primary storage server 502. The primary server module 508 receives the I/O operations 522 and performs the I/O operations 522 on the data storage unit 514. The primary server module 508 simultaneously or near simultaneously sends the I/O operations 522 to the secondary storage server 504 when the I/O operations are "write" operations The secondary server module 516 receives the write I/O operations 522 and also performs the write I/O operations 522 on the data storage unit 520.

When the I/O operations 522 include write operations to write I/O data 524, the I/O data 524 may be cached on the caches 512, 518 prior to being copied to the data storage units 514, 520. The caches 512, 518 may implement either a write-through cache or a write-back cache. If the caches 512, 518 are implemented as write-through caches, then the write I/O data 524 stored in the caches 512, 518 are immediately flushed into the data storage units 514, 520, respectively. When the I/O data 524 are flushed to the data storage units 514, 520, the primary server module 508 may send an acknowledgment to the application server 506 that the write I/O operations 522 have been performed. In the case of write-through caches, the primary server module 508 does not send the acknowledgment until the I/O data 524 have been persisted to the data storage units 514, 520. However, if the caches 512, 518 are implemented as write-back caches, then the primary server module 508 may send the acknowledgment upon caching the I/O data 524 and before the I/O data 524 have been persisted to the data storage units 514, 520. The write I/O operations 522 stored in the caches 512, 518 are later flushed into the data storage units 514, 520 according to the defined write-back cache policy.

A number of problems may occur if the primary storage server 502 and/or the secondary storage server 504 experience a power failure or other suitable failure that takes down the primary storage server 502 and/or the secondary storage server 504. In one example, the secondary storage server 504 may experience a power failure. At the time of the power failure, at least some of the I/O data 524 may be stored in the cache 518 but not yet persisted to the data storage unit 520. If the cache 518 is implemented as a write-back cache, the secondary server module 516 may have already sent an acknowledgment to the primary server module 508 when the I/O data 524 was stored in the cache 518. When the secondary storage server 504 resumes power, the contents of the data storage unit 520 may be inconsistent with the contents of the data storage unit 514.

In another example, the primary storage server 502 may experience a power failure, causing the secondary storage server 504 to become the new active primary storage server. As the new active primary storage server, the secondary storage server 504 may receive and perform new I/O operations from the application server 506. When the primary storage server 502 resumes power, the contents of the data storage unit 514 may be inconsistent with the contents of the data storage unit 520. This inconsistency may include I/O operations that were "in process" between the application server 506 and the secondary storage server 504. This inconsistency may further include I/O data that was cached in the cache 512 but not persisted to the data storage unit 514, as well as I/O operations that were performed on the primary storage server 502 but not yet replicated on the secondary storage server 504.

Two approaches are available to resynchronize the I/O operations 522 between the primary storage server 502 and the secondary storage server 504. In the first approach known as "gating" or "write-intent logging" ("WIL"), the primary server module 508 maintains a gate 526, and the secondary server module 516 maintains a gate 528. In some embodiments, the gate 526 on the primary storage server 502 represents a logical bitmap image of the data storage unit 514 at a specified granularity, and the gate 528 on the secondary storage server 504 represents a logical bitmap image of the data storage unit 520 at a specified granularity. For example, when the primary server module 508 receives the I/O operations 522, the primary server module 508 sets the bits in the gate 526 that correspond to the blocks on the data storage unit 514 that are affected by the I/O operations 522. When the gate 526 is persisted to the data storage unit 514, the primary server module 508 performs the I/O operations 522.

The primary server module 508 also sends the I/O operations 522 to the secondary server module 516. When the secondary server module 516 receives the I/O operations 522, the secondary server module 516 sets the bits in the gate 528 that correspond to the blocks on the data storage unit 520 that are affected by the I/O operations 522. When the gate 528 is persisted to the data storage unit 520, the secondary server module 516 performs the I/O operations 522. When the I/O data 524 has been flushed from the caches 512, 518 to the data storage units 514, 520, the primary server module 508 may acknowledge the application server 506, and the gates 526, 528 may be cleared.

Gating may attempt to track every I/O operation that can potentially cause a difference between the primary storage server 502 and the secondary storage server 504. However, actual differences may not occur until there is some failure. Gating all I/O operations can require tracking and persisting every block that is affected by an I/O operation and serializing the I/O operation prior to performing the I/O operation. As a result, gating may cause a significant performance hit on the I/O operations from the application server 506. Further, since data in both the primary storage server 502 and the secondary storage server 504 need to be protected, two corresponding gates 526, 528 are typically utilized.

The need for gating may be mitigated by having a large timeout 530 in the primary storage server 502 during which relevant bits on the gate 526 will not be cleared even after the I/O operations 522 for the corresponding bits have been completed. The timeout 530 can be configured to provide enough time to ensure that the caches 512, 518 have been flushed before the gate 526 is cleared. Gating can be further improved by increasing the granularity of the gates 526, 528. For example, instead of having each bit associated with one block on the data storage units 514, 520, each bit may be associated with multiple blocks on the data storage units 514, 520. This can reduce the number of times that the gates 526, 528 are stored on the data storage units 514, 520. Despite these improvements, gating may still impact storage system performance. The gating process may also cause a large amount of data to be resynchronized on a connection reinstatement even though some of this data may have already been synchronized previously.

In an effort to address the drawbacks of gating, the primary server module 508 may utilize snapshots 532, 533. In particular, the primary server module 508 and the secondary server module 516 may take the snapshots 532, 533 according to a given snapshot schedule, such as the snapshot schedule 130. The snapshots 532 and the snapshots 533 may be identical. In an illustrative example, the secondary storage server 504 may experience a failure, and the primary storage server 502 may continue receiving new I/O operations from the application server 506 after the failure, causing the primary storage server 502 to be out of sync with the secondary storage server 504. When the secondary storage server 504 resumes operation, the last common snapshot between the primary storage server 502 and the secondary storage server 504 at the time of the failure may be utilized to resynchronize the primary storage server 502 and the secondary storage server 504. By increasing the frequency at which the snapshots 532, 533 are taken, a greater number of consistency points between the primary server module 508 and the secondary server module 516 may also be provided.

Although the snapshots 532, 533 provide a way to resynchronize the primary server module 508 and the secondary server module 516 after a failure of the primary server module 508 and/or the secondary server module 516, the snapshots 532 do not provide a way to identify whether the secondary server module 516 has completed its outstanding I/O operations 522 and flushed the corresponding I/O data 524 to the cache 518. Also, resynchronization based on the last common snapshot may cause some data that is already synchronized to be retransmitted. Further, if any of the snapshots 532 have been deleted, common snapshots may not be available or suboptimal.

According to some embodiments, instead of relying on gating or snapshots, the primary server module 508 may utilize ILM data 534 retrieved from the ILM module 510. In particular, the ILM data 534 may include last timestamps indicating the last time that each block (or more than one block, depending on the defined granularity) was accessed on the data storage units 514, 520. When a failure occurs, any last timestamps indicating blocks that were accessed after the time of the failure may indicate data that is not consistent between the primary storage server 502 and the secondary storage server 504. In an illustrative example, if the secondary storage server 504 fails and the primary storage server 502 continues to receive I/O writes from the application server 506, the primary storage server 502 and the secondary storage server 504 may become out of sync. When the secondary storage server 504 resumes operating, the secondary server module 516 may synchronize those blocks in the data storage unit 520 that have been accessed since the time of the failure according to the ILM data 534.

Further, at the time of the failure, some of the I/O data 524 may be cached in the caches 512, 518 but not yet persisted to the data storage units 514, 520. In order to address the possibility of such data in the caches 512, 518, the primary server module 508 may analyze not only last timestamps indicating blocks that were accessed after the time of the failure but also last timestamps indicating blocks that were accessed before the time of the last failure minus the timeout 530. This may also be referred to herein as a "timeout buffer." As previously described, the timeout 530 can be configured to provide enough time to ensure that the caches 512, 518 have been flushed. For example, if a server fails at 3 PM and the timeout 530 is one hour, then the primary server module 508 may identify blocks that were accessed after 2 PM (i.e., 3 PM minus the one hour timeout buffer). The primary storage server 502 and the secondary storage server 504 may synchronize based on the identified blocks.

Unlike snapshot assisted replication, in synchronous replication every I/O operation represents a consistent image of the data storage units 514, 520, as both the data storage units 514, 520 field each I/O operation simultaneously or near simultaneously on the request of the application server 506. In other words, since both the data storage units 514, 520 complete the I/O operations before acknowledging the application server 506, both the data storage units 514, 520 have a image that is consistent and same from the perspective of the application server 506.

However, as previously described, upon a failure in either the primary storage server 502 or the secondary storage server 504, this consistent image can be lost by outstanding I/O operations and unsaved write-back caches. For example, the secondary storage server 504 may fail. Until the secondary storage server 504 recovers, the secondary storage server 504 will continue to become more and more out of sync with the primary storage server 502, which will continue to receive I/O writes from the application server 506. Hence, when the secondary storage server 504 recovers later on, the secondary storage server 504 may need to find a common and consistent image between the data storage units 514, 520 and continue replication from thereon.

In some embodiments described herein, the common consistent image is represented by some point in time before the failure happened (i.e., when all data in write-back caches in the failed system got completed). It will be appreciated that every block of the volume may have different points in time where the ILM access timestamp could be the same. Hence, unlike snapshot assisted replication, the consistent points may vary from block to block in the system. Accordingly, the process of resynchronization may compare each block (at a configured granularity) for the last write timestamp. Only those blocks that do not match may be resynchronized. As a result, any overhead and performance impact caused by resynchronizing data that is already synchronized may be eliminated.

Figure 6:
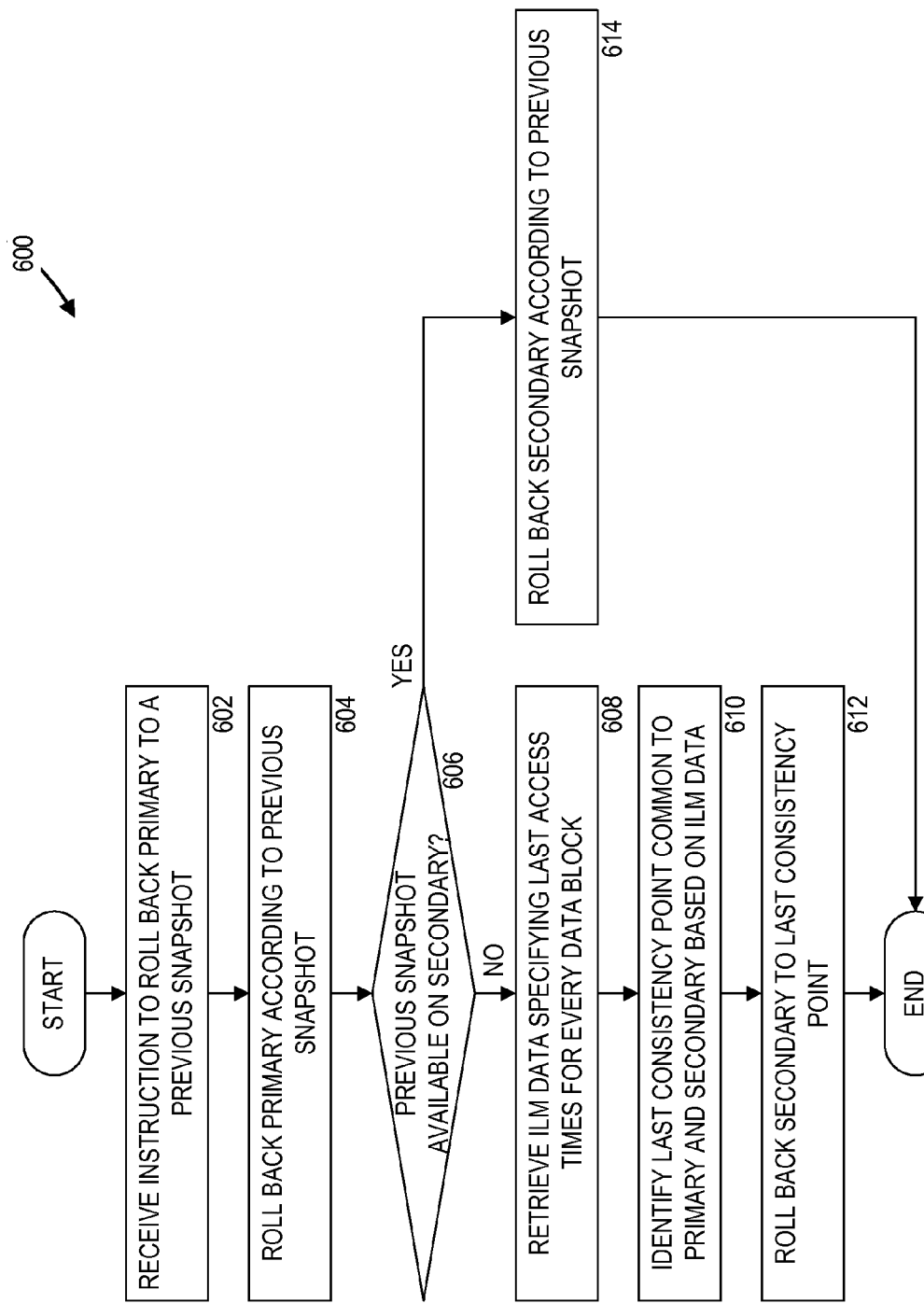
FIG. 6 is a flow diagram showing aspects of a method provided herein for providing ILM-assisted asynchronous replication, in accordance with some embodiments.
Figure 7:
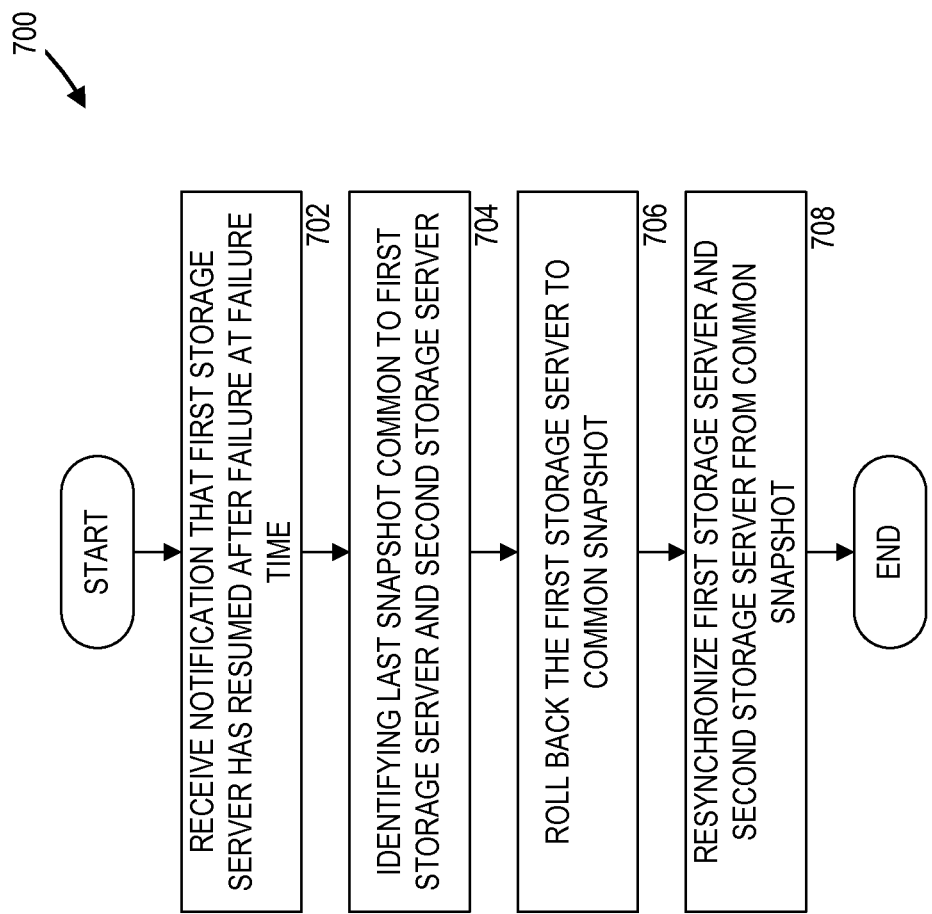
FIG. 7 is a flow diagram showing aspects of a method provided herein for providing snapshot-assisted synchronous replication, in accordance with some embodiments.
Figure 8:
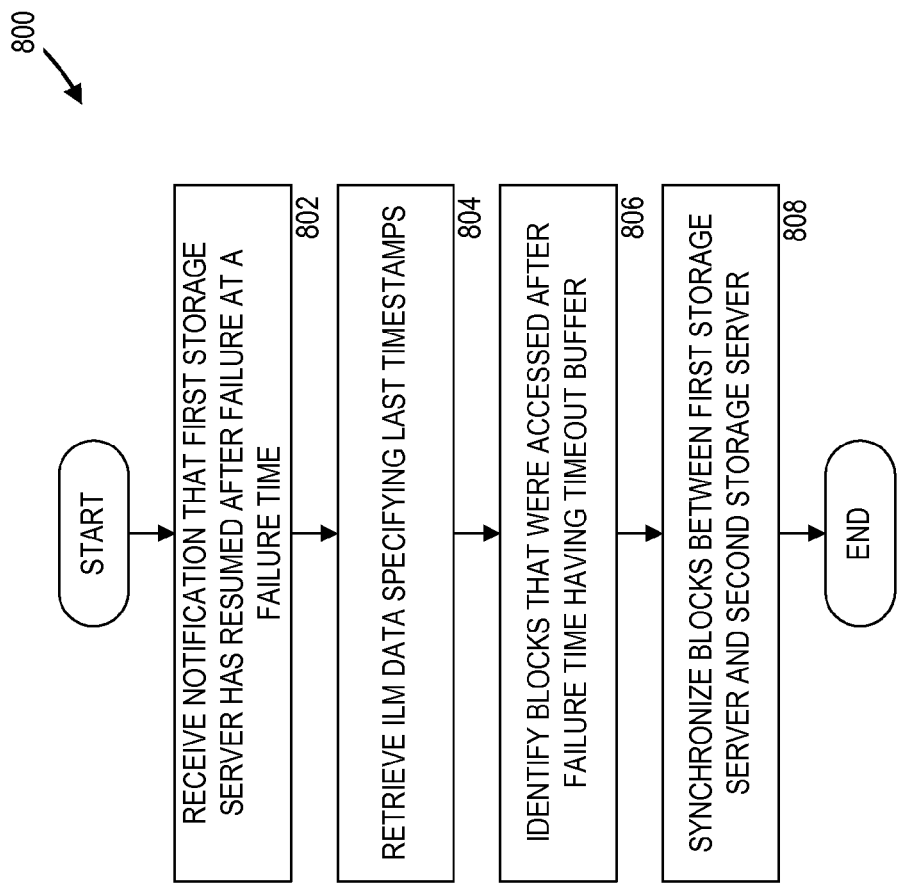
FIG. 8 is a flow diagram showing aspects of a method provided herein for providing ILM-assisted synchronous replication, in accordance with some embodiments.

Referring now to FIGS. 6, 7, and 8, additional details will be provided regarding the utilization of the ILM data 124, the snapshots 532, 533, and the ILM data 534. In particular, FIG. 6 is a flow diagram illustrating aspects of a method provided herein for providing ILM-assisted asynchronous replication. FIG. 7 is a flow diagram illustrating aspects of a method provided herein providing snapshot-assisted synchronous replication. FIG. 8 is a flow diagram illustrating aspects of a method provided herein for providing ILM-assisted synchronous replication. While embodiments described herein primarily utilize ILM data provided by an ILM module, it should be appreciated that other embodiments may utilize similar data from other data sources.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 6, a routine 600 may be performed by the primary replication module 110 and/or the secondary replication module 126. At the beginning the routine 600, the primary storage server 102 may be in a first current state, and the secondary storage server 104 may be in a second current state. The routine 600 begins at operation 602, where the primary replication module 110 receives an instruction to roll back the primary storage server 102 from the first current state to a previous state according to a previous snapshot. For example, an administrator of the primary storage server 102 may initiate the rollback during a DR scenario. The routine 600 then proceeds to operation 604, where the primary replication module 110 rolls back the primary storage server 102 according to the previous snapshot. When the primary replication module 110 rolls back the primary storage server 102, the routine 600 proceeds to operation 606.

At operation 606, the primary replication module 110 determines whether the previous snapshot is available on the secondary storage server 104. If the previous snapshot is not available on the secondary storage server 104, then the routine 600 proceeds to operation 608, where the primary replication module 110 retrieves the ILM data 124 from the ILM module 112. In this case, the ILM data 124 may specify the last access time for each block in the primary storage server 102 and the secondary storage server 104. The routine 600 then proceeds to operation 610, where the primary replication module 110 identifies the last consistency point common to the primary storage server 102 and the secondary storage server 104 based on the retrieved ILM data 124. When the primary replication module 110 identifies the last consistency point, the routine 600 proceeds to operation 612. At operation 612, the primary replication module 110 rolls back the secondary storage server 104 from the second current state to the last consistency point.

If the previous snapshot is available on the secondary storage server 104, then the routine 600 proceeds to operation 614, where the secondary replication module 126 rolls back the data storage unit 128 from the second current state to the previous state according to a previous snapshot. In further embodiments, if the previous snapshot has not yet been taken, then the secondary replication module 126 may wait until the snapshot is replicated. After operations 612, 614, the routine 600 terminates.

Referring to FIG. 7, a routine 700 may be performed by the primary server module 508 and/or the secondary server module 516. The routine 700 begins at operation 702, where the secondary server module 516 receives a notification that the primary server module 508 has resumed after a failure at a failure time. For example, the failure may be a power failure. The routine 700 then proceeds to operation 704, where the primary server module 508 identifies a last common snapshot between the primary storage server 502 and the secondary storage server 504. When the primary server module 508 identifies the last common snapshot between the primary storage server 502 and the secondary storage server 504, the routine 700 proceeds to operation 706.

At operation 706, the primary server module 508 rolls back the primary storage server 502 to the common snapshot. The routine 700 then proceeds to operation 708, where the primary server module 508 and the secondary server module 516 resynchronizes from the secondary storage server 504 to the primary storage server 502 from the common snapshot. Upon resynchronizing the primary storage server 502 and the secondary storage server 504 from the common snapshot, synchronize replication may resume between the primary storage server 502 and the secondary storage server 504.

Referring to FIG. 8, a routine 800 may be performed by the primary server module 508 and/or the secondary server module 516. The routine 800 begins at operation 802, where the primary server module 508 receives a notification that the secondary server module 516 has resumed after a failure at a failure time. For example, the failure may be a power failure. The routine 800 then proceeds to operation 804, where the primary server module 508 retrieves the ILM data 534 from the ILM module 510. In this case, the ILM data 534 may include last timestamps indicating the last time that each block (or more than one block, depending on the defined granularity) was accessed on the data storage unit 514.

The routine 800 proceeds to operation 806, where the primary server module 508 identifies blocks on the data storage unit 514 that were accessed after the failure time. In some embodiments, the failure time may be further enhanced with a timeout buffer. As previously described, the timeout buffer may be configured to ensure that the I/O data 524 on the cache 518 has been completely flushed. The routine 800 then proceeds to operation 808, where the primary server module 508 synchronizes the identified blocks between the primary storage server 502 and the secondary storage server 504. In some embodiments, the primary server module 508 may synchronize only the identified blocks. In this way, bandwidth is not wasted. After the operation 808, the routine 800 terminates. In some embodiments, the primary server module 508 may also an acknowledgment to the application server 506 that the synchronization is complete if required.

Figure 9:
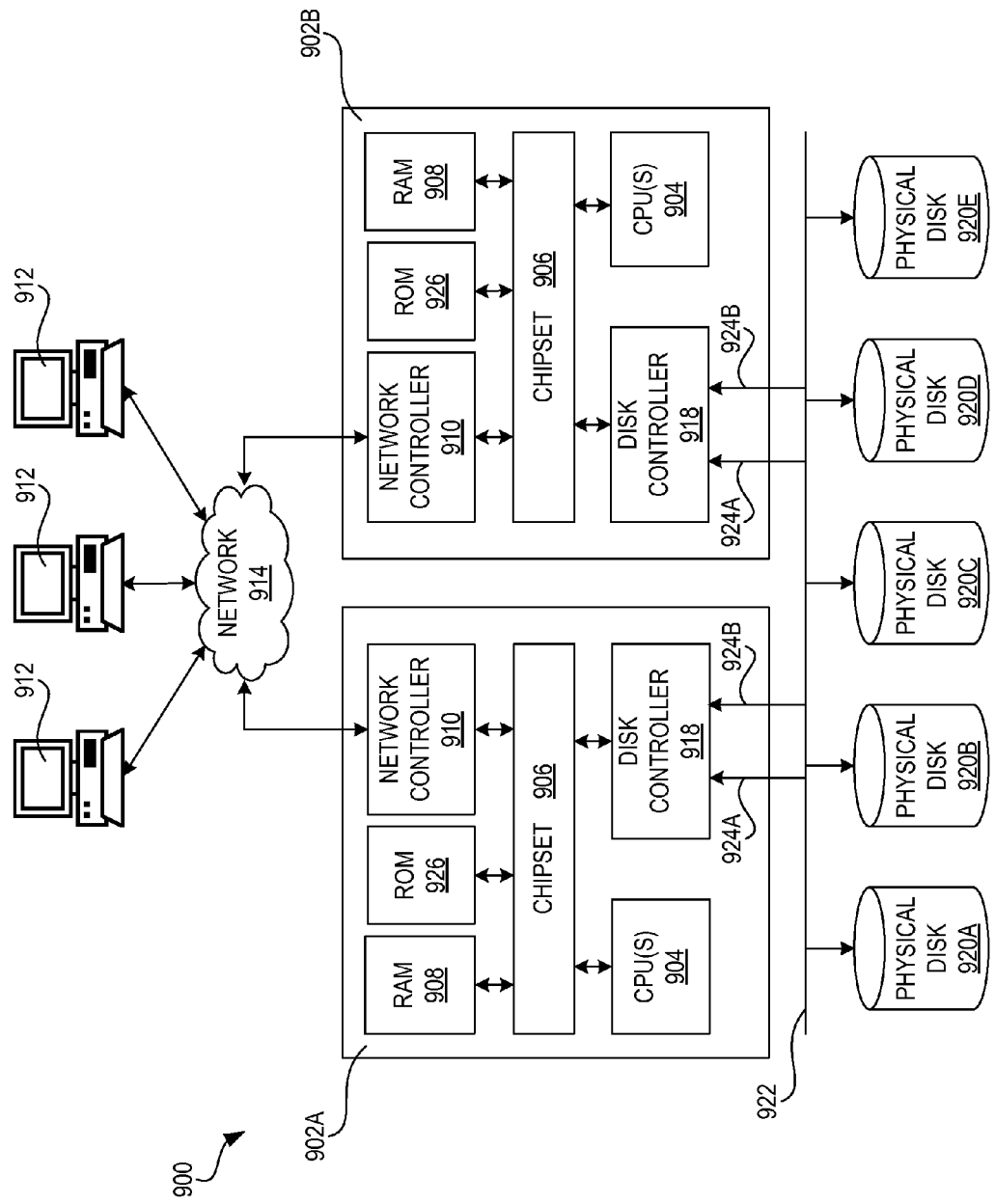
FIG. 9 is a computer architecture diagram showing aspects of an illustrative computer hardware architecture for a computing system capable of implementing aspects of the embodiments presented herein.

FIG. 9 and the following discussion are intended to provide a brief, general description of a suitable computing environment in which the embodiments described herein may be implemented. In particular, FIG. 9 shows an exemplary storage system 900 including a storage computer, or storage controller 902A, 902B (collectively and generically storage controller 902). Examples of the storage controller 902 include the primary storage servers 102, 502 and the secondary storage servers 104, 504. The storage controller 902 includes a baseboard, or "motherboard," which is a printed circuit board to which a multitude of components or devices may be connected by way of a system bus or other electrical communication paths. In one illustrative embodiment, one or more central processing units ("CPUs") 904 operate in conjunction with a chipset 906. The CPUs 904 are standard programmable processors that perform arithmetic and logical operations necessary for the operation of the storage controller 902.

The CPUs 904 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the storage controller 902. The chipset 906 also provides an interface to a random access memory ("RAM") 908 used as the main memory in the storage controller 902. The chipset 906 also includes functionality for providing network connectivity through a network controller 910, such as a gigabit Ethernet adapter. The network controller 910 is capable of connecting the storage controllers 902A, 902B to each other as well as to other client computers 912 acting as initiators of I/O operations over a network 106. The network 106 may be an Ethernet or Gigabyte Ethernet LAN, a fiber ring, a fiber star, wireless, optical, satellite, a WAN, a MAN, or any other network technology, topology, protocol, or combination thereof.

According to embodiments, the storage controller 902 is connected to a number of physical storage devices, such as physical disks 920A-920E (also referred to herein as physical disks 920) shown in FIG. 9. The physical disks 920 provide the data storage capacity required for the storage controller 902 to store data and service I/O operations initiated by the client computers 912 over the network 914. A disk controller 918 allows the storage controller 902 to communicate with the physical disks 920 connected to the storage controller. According to one embodiment, the disk controller 918 may interface with the physical disks 920 through a serial attached SCSI ("SAS") interface. In other embodiments, the disk controller 918 may interface with the physical disks 920 utilizing a serial advanced technology attachment ("SATA") interface, a fiber channel ("FC") interface, or other standard interface for physically connecting and transferring data between computers and physical storage devices.

According to embodiments, the physical disks 920 may be connected to the storage controller 902 through a bus 922 that allows the disk controller 918 to communicate with the disks. In one embodiment, the physical and electrical structure of the bus 922 may be based upon the storage bridge bay ("SBB") specification. The SBB specification defines mechanical, electrical, and low-level enclosure management requirements for a single enclosure that supports the connection of multiple storage controllers 902 as well as multiple physical disks 920 from a variety of hardware and system vendors. The SBB mid-plane provides the bus 922 that allows multiple storage controller 902 to be connected to and communicate with the physical disks 920 concurrently. According to embodiments, the disk controller 918 is capable of utilizing multiple point-to-point communication channels, or ports 924A, 924B, to communicate with other devices over the SBB bus 922. For example, the disk controller 918 may utilize one or more ports 924A to communicate with each physical disk 920 across the bus 922, while utilizing a separate port 924B to communicate across the bus with another storage controller 902.

The storage controller 902 may store data on the physical disks 920 by transforming the physical state of the disks to reflect the information being stored. The specific transformation of physical state may depend on various factors, in different implementations of this description. Examples of such factors may include, but are not limited to, the technology used to implement the physical disks 920, whether the physical disks are characterized as primary or secondary storage, and the like. For example, the storage controller 902 may store data to the physical disks 920 by issuing instructions to the disk controller 918 to alter the magnetic characteristics of particular locations within the physical disk drives. These transformations may also include altering the physical features or characteristics of other media types, including altering the reflective or refractive characteristics of a particular location in an optical storage device, or modifying the electrical characteristics of a particular capacitor, transistor, or other discrete component in a solid-state storage device. Other transformations of physical media are possible without departing from the scope and spirit of the present description, with the foregoing examples provided only to facilitate this discussion. The storage controller 902 may further read information from the physical disks 920 by detecting the physical states or characteristics of one or more particular locations within the devices.

In addition to the physical disks 920 described above, the storage controller 902 may have access to other computer-readable storage medium to store and retrieve information, such as program modules, data structures, or other data. It should be appreciated by those skilled in the art that computer-readable storage media can be any available media that can be accessed by the storage controller 902. By way of example, and not limitation, computer-readable storage media may include volatile and non-volatile, removable and non-removable media implemented in any method or technology. Computer-readable storage media includes, but is not limited to, RAM, ROM, EPROM, EEPROM, flash memory or other solid-state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the storage controller 902.

The computer-readable storage media may store an operating system (not shown) utilized to control the operation of the storage controller 902. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The computer-readable storage media may store other system or application programs and data utilized by the storage controller 902. In one embodiment, the computer-readable storage medium may be encoded with computer-executable instructions that, when loaded into the storage controller 902, may transform the computer system from a general-purpose computing system into special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the storage controller 902 by specifying how the CPUs 904 transitions between states, as described above. According to one embodiment, the storage controller 902 may have access to computer-readable storage media storing computer-executable instructions that, when executed by the computer system, perform the routines for providing assisted storage replication, as described in greater detail above with reference to FIGS. 1-8.

The chipset 906 may also provide an interface to a computer-readable storage medium such as a ROM 926 or NVRAM for storing a firmware that includes program code containing the basic routines that help to startup the storage controller 902 and to transfer information between elements within the storage controller. The ROM 924 or NVRAM may also store other software components necessary for the operation of the storage controller 902 in accordance with the embodiments described herein. It will be appreciated that the storage controller 902 might not include all of the components shown in FIG. 9, may include other components that are not explicitly shown in FIG. 9, or may utilize an architecture completely different than that shown in FIG. 9.

Based on the foregoing, it should be appreciated that technologies for providing ILM assisted asynchronous replication are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing snapshot-assisted synchronous replication between a first storage server and a second storage server, the computer-implemented method comprising:
   receiving a notification at the second storage server that the first storage server has resumed operations following a failure, the first storage server being in a first current state and the second storage server being in a second current state;
   identifying a most-recent common snapshot stored on the first storage server and the second storage server, respectively, at a time of receiving the notification;
   upon identifying the most-recent common snapshot, rolling back the first storage server from the first current state to a previous state according to the most-recent common snapshot; and
   upon rolling back the first storage server from the first current state to the previous state, re-synchronizing from the second storage server to the first storage server from the most-recent common snapshot, wherein the most common snapshot comprises a first common snapshot stored on the first storage server and a second common snapshot stored on the second storage server, the second common snapshot being replicated from the first common snapshot prior to the time of receiving the notification, and the first common snapshot and the second common snapshot defining the previous state.

2. The computer-implemented method of claim 1, wherein re-synchronizing from the second storage server to the first storage server further comprises rolling back a current replication point of the second storage server from the second current state to the previous state according to the most-recent common snapshot.

3. The computer-implemented method of claim 2, wherein the first storage server is rolled back from the first current state to the previous state according to the first common snapshot, and the current replication point of the second storage server is rolled back from the second current state to the previous state according to the second common snapshot.

4. The computer-implemented method of claim 1, further comprising taking the first common snapshot of the first storage server and the second common snapshot of the second storage server based on a snapshot schedule.

5. The computer-implemented method of claim 1, further comprising upon re-synchronizing the first storage server and the second storage server using the most-recent common snapshot, resuming synchronous replication of I/O operations between the first storage server and the second storage server.

6. The computer-implemented method of claim 5, wherein resuming synchronous replication of I/O operations between the first storage server and the second storage server further comprises:
    receiving an I/O operation at the first storage server; and
    replicating the I/O operation to the second storage server before acknowledging the I/O operation.

7. A non-transitory computer-readable medium having computer-executable instructions stored thereon for providing snapshot-assisted synchronous replication between a first storage server and a second storage server that, when executed by a processor, cause the processor to:
    receive a notification that the first storage server has resumed operations following a failure, the first storage server being in a first current state and the second storage server being in a second current state;
    identify a most-recent common snapshot stored on the first storage server and the second storage server, respectively, at a time of receiving the notification;
    upon identifying the most-recent common snapshot, roll back the first storage server from the first current state to a previous state according to the most-recent common snapshot; and
    upon rolling back the first storage server from the first current state to the previous state, re-synchronize from the second storage server to the first storage server from the most-recent common snapshot, wherein the most-recent common snapshot comprises a first common snapshot stored on the first storage server and a second common snapshot stored on the second storage server, the second common snapshot being replicated from the first common snapshot prior to the time of receiving the notification, and the first common snapshot and the second common snapshot defining the previous state.

8. The non-transitory computer-readable medium of claim 7, wherein re-synchronizing from the second storage server to the first storage server further comprises rolling back a current replication point of the second storage server from the second current state to the previous state according to the most-recent common snapshot.

9. The non-transitory computer-readable medium of claim 8, wherein the first storage server is rolled back from the first current state to the previous state using the first common snapshot, and the current replication point of the second storage server is rolled back from the second current state to the previous state using the second common snapshot.

10. The non-transitory computer-readable medium of claim 7, having further computer-executable instructions stored thereon that, when executed by the processor, cause the processor to take the first common snapshot of the first storage server and the second common snapshot of the second storage server based on a snapshot schedule.

11. The non-transitory computer-readable medium of claim 7, having further computer-executable instructions stored thereon that, when executed by the processor, cause the processor to upon re-synchronizing the first storage server and the second storage server using the most-recent common snapshot, resume synchronous replication of I/O operations between the first storage server and the second storage server.

12. The non-transitory computer-readable medium of claim 11, wherein resuming synchronous replication of I/O operations between the first storage server and the second storage server further comprises:
    receiving an I/O operation at the first storage server; and
    replicating the I/O operation to the second storage server before acknowledging the I/O operation.

13. A computer storage system for providing snapshot-assisted synchronous replication, comprising:
    a processor;
    a memory operatively coupled to the processor; and
    a program module that executes in the processor from the memory and that, when executed by the processor, causes the computer storage system to provide snapshot-assisted synchronous replication between a first storage server and a second storage server by:
        receiving a notification that the first storage server has resumed operations following a failure, the first storage server being in a first current state and the second storage server being in a second current state;
        identifying a most-recent common snapshot stored on the first storage server and the second storage server, respectively, at a time of receiving the notification;
        upon identifying the most-recent common snapshot, rolling back the first storage server from the first current state to a previous state according to the most-recent common snapshot; and
        upon rolling back the first storage server from the first current state to the previous state, re-synchronizing from the second storage server to the first storage server from the most-recent common snapshot, wherein the most-recent common snapshot comprises a first common snapshot stored on the first storage server and a second common snapshot stored on the second storage server, the second common snapshot being replicated from the first common snapshot prior to the time of receiving the notification, and the first common snapshot and the second common snapshot defining the previous state.

14. The computer storage system of claim 13, wherein re-synchronizing from the second storage server to the first storage server further comprises rolling back a current replication point of the second storage server from the second current state to the previous state according to the most-recent common snapshot.

15. The computer storage system of claim 14, wherein the first storage server is rolled back from the first current state to the previous state according to the first common snapshot, and the current replication point of the second storage server is rolled back from the second current state to the previous state according to the second common snapshot.

16. The computer storage system of claim 13, wherein the program module further causes the computer storage system to upon re-synchronizing the first storage server and the second storage server using the most-recent common snapshot, resume synchronous replication of I/O operations between the first storage server and the second storage server.

17. The computer storage system of claim 16, wherein resuming synchronous replication of I/O operations between the first storage server and the second storage server further comprises:
   receiving an I/O operation at the first storage server; and
   replicating the I/O operation to the second storage server before acknowledging the I/O operation.

\* \* \* \* \*